(12) United States Patent
Zafiroglu et al.

(10) Patent No.: US 10,453,084 B2
(45) Date of Patent: Oct. 22, 2019

(54) SYSTEMS AND METHODS FOR GENERATING AND VALIDATING INCENTIVES BASED ON MULTI-PERSON VEHICLE OCCUPANCY

(71) Applicants: Alexandra Zafiroglu, Portland, OR (US); Jennifer Healey, San Jose, CA (US)

(72) Inventors: Alexandra Zafiroglu, Portland, OR (US); Jennifer Healey, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/724,802

(22) Filed: Dec. 21, 2012

(65) Prior Publication Data

US 2014/0180773 A1 Jun. 26, 2014

(51) Int. Cl.
*G07B 15/06* (2011.01)
*G06Q 30/02* (2012.01)
(Continued)

(52) U.S. Cl.
CPC ....... *G06Q 30/0207* (2013.01); *G07B 15/063* (2013.01); *G08G 1/017* (2013.01); *G08G 1/0112* (2013.01); *G06Q 50/30* (2013.01)

(58) Field of Classification Search
CPC .. G07B 150/063; G07B 15/063; G07B 15/06; G06Q 30/0284; G06Q 30/04;
(Continued)

(56) References Cited

U.S. PATENT DOCUMENTS 4,336,522 A * 6/1982 Graham ........................ 340/459
5,920,057 A * 7/1999 Sonderegger et al. ....... 235/384
(Continued)

FOREIGN PATENT DOCUMENTS

CN 101801730 8/2010
JP 2003-178343 6/2003
(Continued)

OTHER PUBLICATIONS

Pavlidis et al., A vehicle occupant counting system based on near-infrared phenomenology and fuzzy neural classification, Jun. 2000, IEEE Transactions on Intelligent Transportation Systems, vol. 1, Issue: 2, pp. 72-85 (Year: 2000).*

(Continued)

*Primary Examiner* — Rupangini Singh
(74) *Attorney, Agent, or Firm* — Eversheds-Sutherland (US) LLP

(57) ABSTRACT

Systems and methods for determining a number of vehicle occupants based at least in part on sensor data gathered by one or more in-vehicle sensors are disclosed. The number of vehicle occupants may be determined, at least in part, by an in-vehicle system associated with the vehicle. Vehicle occupancy information indicative of the number of vehicle occupants may be transmitted to facilitate identification of one or more incentives based at least in part on the vehicle occupancy information. The incentive(s) may include a reduction in a fee associated with operation of the vehicle such as a discounted toll amount, an elimination of a fee, an incentive payment, a discount associated with a product or service offering, and so forth. A tolling system ma be provided for receiving the vehicle occupancy information and determining a toll amount based at least in part on the received information.

33 Claims, 8 Drawing Sheets

(51) Int. Cl.
*G08G 1/01* (2006.01)
*G08G 1/017* (2006.01)
*G06Q 50/30* (2012.01)

(58) Field of Classification Search
CPC .. G06Q 30/0207; G06Q 50/30; G08G 1/0112; G08G 1/017
USPC .......................... 705/13; 340/928, 905, 10 X
See application file for complete search history.

(56) References Cited

U.S. PATENT DOCUMENTS

| | | | |
|---|---|---|---|
| 7,375,648 B1* | 5/2008 | Mulka et al. ................ 340/905 | |
| 8,055,534 B2 | 11/2011 | Ashby et al. | |
| 2002/0080014 A1* | 6/2002 | McCarthy et al. ........... 340/426 | |
| 2004/0045759 A1* | 3/2004 | Kiribayashi ...... B60R 21/01556 | |
| | | | 180/271 |
| 2005/0179563 A1* | 8/2005 | Kelley .......................... 340/928 | |
| 2006/0015394 A1* | 1/2006 | Sorensen ........................ 705/13 | |
| 2007/0278300 A1* | 12/2007 | Dawson et al. ............. 235/384 | |
| 2009/0093932 A1 | 4/2009 | McCall et al. | |
| 2010/0026465 A1* | 2/2010 | Gravelle et al. ............ 340/10.1 | |
| 2010/0085213 A1* | 4/2010 | Turnock et al. ............. 340/928 | |
| 2010/0106567 A1* | 4/2010 | McNew et al. ................ 705/13 | |
| 2010/0161392 A1* | 6/2010 | Ashby et al. .................. 705/13 | |
| 2010/0201505 A1* | 8/2010 | Honary et al. ............. 340/425.5 | |
| 2010/0295563 A1* | 11/2010 | Bieck et al. ................... 324/679 | |
| 2011/0090095 A1* | 4/2011 | Goldmann et al. ........... 340/928 | |
| 2011/0102156 A1* | 5/2011 | Gravelle et al. ............. 340/10.6 | |
| 2011/0137773 A1* | 6/2011 | Davis et al. .................... 705/34 | |
| 2012/0109692 A1* | 5/2012 | Collins .................. G06Q 40/08 | |
| | | | 705/4 |
| 2012/0143786 A1* | 6/2012 | Karner .......................... 705/400 | |
| 2013/0141383 A1* | 6/2013 | Woolley et al. ......... G06F 3/044 | |
| | | | 345/174 |
| 2013/0173028 A1* | 7/2013 | Felty ...................... G05B 13/02 | |
| | | | 700/79 |

FOREIGN PATENT DOCUMENTS

| | | |
|---|---|---|
| JP | 2004-171141 | 6/2004 |
| JP | 2004-227497 A | 8/2004 |
| JP | 2004227497 | 8/2004 |
| JP | 2011-016396 | 1/2011 |

OTHER PUBLICATIONS

International Search Report and Written Opinion received for PCT Patent Application No. PCT/US2013/048137, dated Sep. 27, 2013, 13 pages.
Korean Office Action received in Patent Application No. 2015-701335 dated Mar. 4, 2016, 19 pages (including translation).
Extended European Search Report for European Patent Application No. 13864051 completed Oct. 4, 2016, 7 pages.
First Office Action for Chinese Application No. 201380060827.5, dated May 3, 2017, 39 pages (24 pages English translation).
Office Action for Chinese Application No. 201380060827, dated Dec. 29, 2017, 55 pages (34 pages English Translation, 21 pages Chinese).
Office action for Chinese Application No. 201380060827.5, dated Jul. 16, 2018, 51 pages (32 pages English, 19 pages Chinese).

\* cited by examiner

US 10,453,084 B2

SYSTEMS AND METHODS FOR GENERATING AND VALIDATING INCENTIVES BASED ON MULTI-PERSON VEHICLE OCCUPANCY

BACKGROUND

Throughout the world, traffic congestion has worsened significantly over the last several decades. Rising income levels, particularly in developing nations, has led to a dramatic increase in the number of individuals who are able to afford a motor vehicle for the first time as well as individuals who are able to upgrade to larger vehicles. This increase in the number and typical size of vehicles seeking to share roadways, combined with other factors such as population growth and shifting demographics, has placed an enormous burden on existing roadway and bridge infrastructure. Further, as a result of spatial, budgetary, or other limitations, construction of additional transport infrastructure has not been able to keep pace with the dramatic rise in the number of vehicles occupying roadways.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals indicates similar or identical components; however, different reference numerals may be used to identify similar or identical components as well. Various embodiments ma utilize element(s) and/or component(s) other than those illustrated in the drawings and some element(s) and/or component(s) may not be present in various embodiments. The use of singular terminology to describe a component or element may, depending on the context, encompass a plural number of such components or elements and vice versa.

DETAILED DESCRIPTION

Overview

Figure 1A:
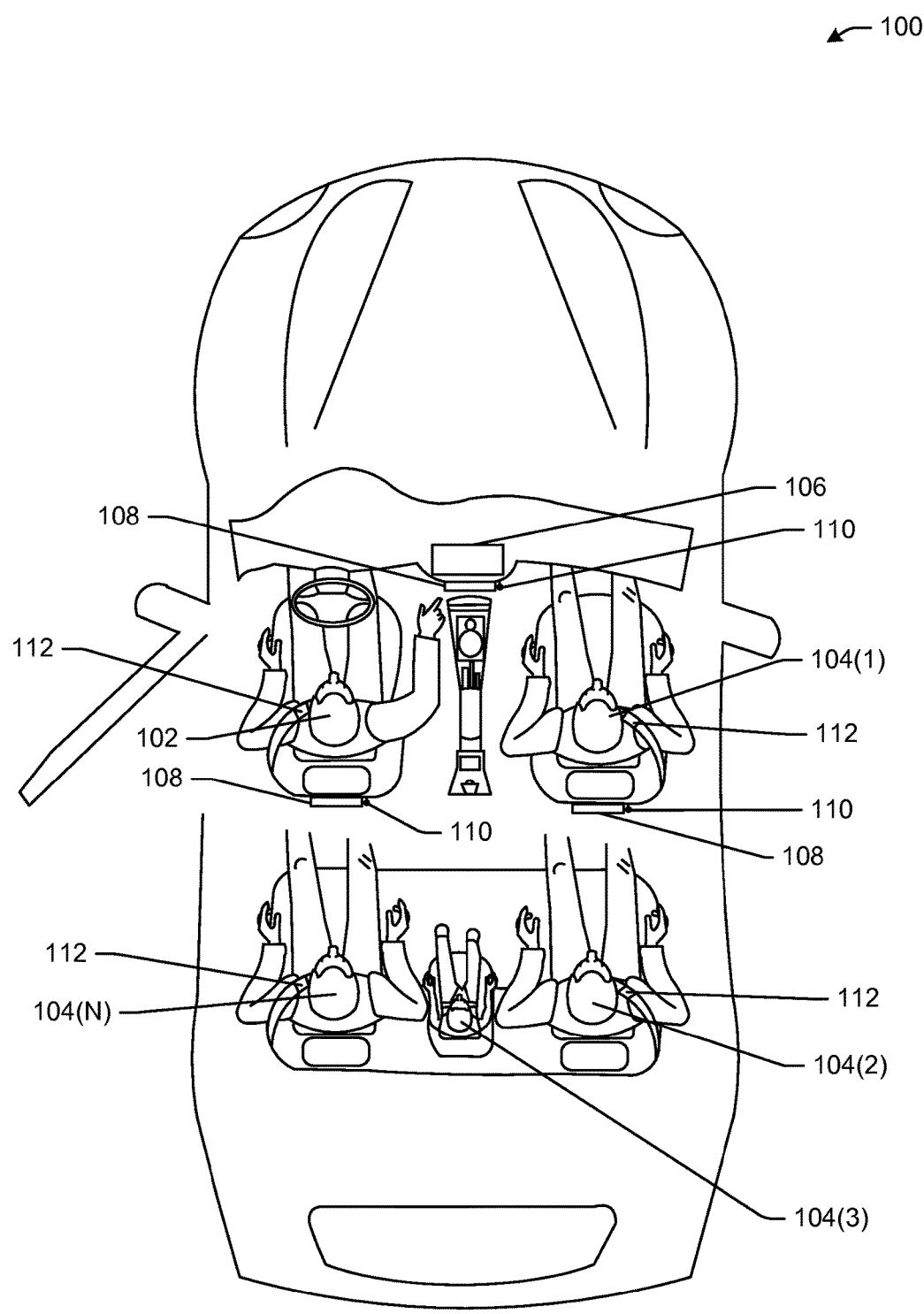
FIG. 1A schematically depicts an illustrative vehicle including various illustrative components in accordance with one or more embodiments of the disclosure.

Roadways, bridges, and other vehicle transport infrastructure throughout the world are becoming increasingly congested as rising income levels have made motor vehicle ownership a reality for more of the global population. Further, rising levels of migration of individuals from more rural areas to urban centers has exacerbated the burden that increased vehicle ownership has placed on vehicle transport infrastructure.

Various efforts focused on easing traffic congestion have been undertaken by local municipalities and other authorities charged with maintaining and/or regulating the use of roadways or other vehicle transport infrastructure. These efforts have traditionally focused on limiting the number of vehicles sharing a roadway during a given period of time (e.g., during peak congestion periods). Such efforts have included, for example, placing limitations on the type and/or number of vehicles that may use a roadway and/or temporal limitations on the use of a roadway, assessing tolls or other fees for use of stretches of a roadway, a bridge, or other infrastructure, and so forth. The above-described efforts have served to passively encourage ride-sharing or carpooling.

Efforts that actively encourage ride-sharing or carpooling have also been undertaken. For example, many roadways passing through urban metropolitan areas include high-occupancy vehicle (HOV) lanes that are legally available only to those vehicles having a number of occupants that meets or exceeds a threshold number. Measures such as these seek to incentivize ride-sharing or carpooling by offering potentially reduced travel times in exchange. While the efforts undertaken thus far, including those described above, have had some success in incentivizing ride-sharing or carpooling, it is clear that such efforts will not be sufficient to ease the ever-increasing congestion of roadways and other infrastructure.

This disclosure relates to systems, methods, computer-readable media, techniques and methodologies for providing various incentives based on increased vehicle occupancy. In certain embodiments, a fee associated with operation of a vehicle may be reduced based on vehicle occupancy information indicative of a number of vehicle occupants occupying a vehicle for a given period of time. The amount of the reduction in the fee may be determined based on the number of vehicle occupants. For example, the amount of the reduction may be positively correlated to an increase in the number of vehicle occupants such that a particular increase in the number of vehicle occupants leads to a corresponding increase in the amount by which the fee may be reduced. In certain embodiments, the fee associated with operation of the vehicle may correspond to a toll assessed for use of a particular stretch of roadway, a toll assessed for use of a bridge, a fee assessed in connection with legal requirements associated with use of a vehicle (e.g., a vehicle registration fee), and so forth.

In certain embodiments, the incentives provided based on increased vehicle occupancy may be further based on one or more additional parameters relating to operation of a vehicle such as, the example, a time of day during which a vehicle is operated. As a non-limiting example, an increased incentive may be provided based on increased vehicle occupancy during a peak travel period as compared to a non-peak travel period. In this manner, vehicle operators may be incentivized to increase vehicle occupancy during peak travel periods. Further, in certain embodiments, the incentives may include an elimination of a fee altogether or an incentive payment. Referring again to the above non-limiting example, if a vehicle is determined to have a threshold number of occupants (e.g., three or more) during a peak travel period, a fee (e.g., a toll amount) typically associated with operation of the vehicle during that time period may be eliminated or an incentive payment may be made to an appropriate entity associated with the vehicle (e.g., registered owner of the vehicle).

Other types of incentives may additionally or alternatively be provided based on a number of vehicle occupants. For example, an incentive identified based on the vehicle occupancy information may include a discount on a product or service offering. In certain embodiments, an incentive may include a discount redeemable towards a future purchase such as, for example, a future toll, a vehicle registration fee, a gas purchase, or any other future purchase. In various embodiments, points associated with a loyalty rewards program may be accrued based on vehicle occupancy information indicative of increased vehicle occupancy. The points may be redeemable for any of a variety of products or services. It should be appreciated that the above-described examples are merely illustrative and not exhaustive and that embodiments of the disclosure are applicable to any type of incentive that may be provided based on vehicle occupancy information.

A system that includes one or more computer processors may be provided in association with a vehicle. In various embodiments, the system may include an in-vehicle infotainment (IVI) system. Various types of sensors may be provided in the vehicle to capture sensor data that may be indicative of a number of vehicle occupants. These sensors may include, for example, pressure sensors embedded in seats of the vehicle, temperature sensors, sensors capable of detecting and measuring heart rates of occupants, imaging devices, devices capable of capturing audio information generated by occupants of the vehicle, and so forth. It should be appreciated that the above-described types of sensors are merely illustrative and that any suitable sensor capable of capturing data that may be used, at least in part, to determine a number of vehicle occupants is within the scope of this disclosure.

The sensor data may be received by at least one processor which may be configured to determine vehicle occupancy information indicative of a number of vehicle occupants based at least in part on the sensor data. Any suitable algorithm may be used to determine vehicle occupancy based on the sensor data. For example, in certain embodiments, data received from certain sensors may be more reliable in assessing vehicle occupancy. Accordingly, an algorithm that applies respective weights to data received from a plurality of sensors may be employed. As another non-limiting example, the data received from a particular sensor may be analyzed to support or reject a number of vehicle occupants indicated by data received from another sensor. Such cross-analysis of data received from a variety of sensors may assist in guarding against individuals seeking to create a false impression of the number of vehicle occupants. For example, data received from a seat pressure sensor or a heart rate sensor may be compared to data received from an imaging device to support or reject the occupancy indicated by the seat pressure or heart rate sensor data. Numerous other examples are within the scope of this disclosure.

In certain embodiments, a score or other metric indicative of a likelihood of a certain number of vehicle occupants may be determined for each potential number of occupants of the vehicle. The number of potential occupants having the highest associated score may be determined to be the number of occupants of the vehicle. In various embodiments, if no potential number of vehicle occupants has an associated score that meets or exceeds a predetermined threshold, sensor data from sensors provided externally to the vehicle (e.g., camera provided in connection with a tolling infrastructure) may be used to resolve inconsistencies between sensor data received from the in-vehicle sensors. However, it should be appreciated that embodiments of the disclosure are not so limited, and that any combination of sensor data received from in-vehicle sensors and external sensors may be used to generate the vehicle occupancy information indicative of a number of vehicle occupants.

The sensor data may be received periodically at predefined intervals. In other embodiments, the sensor data may be received upon detecting that an occupancy determination condition exists. An occupancy determination condition may be any condition that triggers a redetermination of vehicle occupancy based on current sensor data received from the sensor(s) in the vehicle. Occupancy determination conditions may include, but are not limited to, the opening and/or closing of a vehicle door, the opening and/or closing of a vehicle window, the speed of the vehicle being below a predetermined threshold speed for a specified period of time, the use of the vehicle ignition, and so forth. It should be appreciated that the above examples of occupancy determination conditions are merely illustrative and not exhaustive and that any suitable change in one or more characteristics associated with a vehicle state may correspond to an occupancy determination condition.

Upon determination of the vehicle occupancy information, the information may be transmitted to any of a variety of entities to determine one or more incentives based on the vehicle occupancy information. For example, the vehicle occupancy information may be transmitted to a tolling infrastructure to determine a toll amount based on the information, to a government agency associated with regulating the operation and use of motor vehicles, to one or more remote servers that store information received from the IVI system of a vehicle, to a private entity (e.g., private business) that may provide incentives (e.g., a discount on a product or service offering) based on the information, and so forth. It should be appreciated that the above-described examples are merely illustrative and not exhaustive and that the vehicle occupancy information may be transmitted to any suitable entity.

In various embodiments, a nature of the incentive may be determined based on a number of vehicle occupants indicated by the vehicle occupancy information. For example, in certain embodiments, where the incentive is a reduction in a fee (e.g., a toll, a registration etc.) assessed in connection with operation of to vehicle, the extent of the reduction may be positively correlated to the number of vehicle occupants. For example, as the number of vehicle occupants increases, the amount of the reduction in a fee may increase in accordance with any suitable proportional relationship (e.g., linear, exponential, logarithmic, etc.). In this manner, ride-sharing or carpooling may be actively incentivized through providing incentives such as discounts on current or future fees, elimination of current or future fees, and/or incentive payments or other monetary or non-monetary rewards or benefits based on increased vehicle occupancy. In addition, the methodologies described herein may be more effective than conventional methods for encouraging ride-sharing or carpooling because motor vehicle operators are more likely to adjust their behavior in order to receive a tangible reward or benefit in the form of a monetary discount or other monetary or non-monetary reward.

The vehicle occupancy information may be transmitted in accordance with a variety of mechanisms. For example, the vehicle occupancy information may be transmitted using a wireless transmitter provided in association with the vehicle. The transmitter may be, for example, a dedicated short-range communications (DSRC) transmitter configured to transmit the vehicle occupancy information to a DSRC receiver in accordance with a DSRC communications protocol. The DSRC receiver may be provided, for example, in association with a tolling infrastructure that is within range of the transmitter. In other embodiments, the vehicle occupancy information may be stored on a reprogrammable electronic tolling tag. The electronic tolling tag may be configured to transmit the vehicle occupancy information in response to an interrogation signal received, for example, from an RFID reader or interrogator provided in association with the tolling infrastructure. In other embodiments, the vehicle occupancy information may be transmitted to one or more remote servers via any suitable network or combination of networks. The remote server(s) may store information received from an IVI system of a vehicle and may provide network access to various operational information associated with a vehicle to an operator of the vehicle, for example. In certain embodiments, the vehicle occupancy information may be transmitted to one or more private entities—directly from the IVI system of a vehicle or via one or more intermediaries—that may provide incentives based on the information. It should be appreciated that the above examples are merely illustrative and that the vehicle occupancy information may be transmitted in accordance with any suitable transmission mechanism.

In various embodiments, the vehicle occupancy information may include historical vehicle occupancy information relating to one or more vehicle occupancy parameters associated with operation of the vehicle over a specified period of time. The vehicle occupancy parameters may include, but are not limited to, a parameter indicative of a respective percentage of travel time in which the vehicle included a corresponding potential number of vehicle occupants, a parameter indicative of an average speed of the vehicle, a parameter indicative of a respective percentage of travel time during which the vehicle speed was within a corresponding, one of a plurality of ranges of speed, a parameter indicative of a respective percentage of the travel time associated with each of a variety of infrastructures, stretches of roadways or bridges, etc., a parameter indicative of a total distance traveled, and so forth. It should be appreciated that the above examples are merely illustrative and not exhaustive and that numerous other examples are within the scope of this disclosure.

In various embodiments, one or more incentives may be identified, based at least in part on the historical vehicle occupancy information. As a non-limiting example, a reduction in a toll amount may be greater for operators whose associated historical vehicle occupancy information indicates a greater percentage of travel time during which the vehicle included multiple occupants; a greater percentage of travel time spent on roadways requiring a toll; a smaller percentage of travel time in which the vehicle's speed exceeded (by some threshold amount) a target speed, and so forth. In other embodiments, discounts on product or service offerings from a private entity may be greater for vehicle operators whose associated historical vehicle occupancy information indicates a greater percentage of vehicle travel time on roadways within a certain distance from a business location or for any of the indications noted above. It should be appreciated that the above examples are merely illustrative and not exhaustive and that the incentives may be determined based on current vehicle occupancy information or historical vehicle occupancy information according to any suitable methodology.

Embodiments of the disclosure also relate to a system comprising one or more computers that are configured to identify one or more incentives based at least in part on received vehicle occupancy information. The incentives may include discounts applied to product or service offerings. Further, as previously described, in certain embodiments, the incentives may correspond to a reduction in a fee associated with the operation of a vehicle (e.g., a discount applied to a toll). In various embodiments, the above-described system may be a tolling system comprising one or more computers (e.g., servers). The tolling system may be capable of receiving vehicle occupancy information and determining, a discount to be applied, if any, to a default toll amount. The default toll amount may be based on any number of static parameters such as a size or type of the vehicle, the particular stretch of roadway, bridge, etc. for which the toll amount is being assessed, and so forth. In certain embodiments, the vehicle occupancy information may represent a number of vehicle occupants determined to be present in the vehicle during a particular period of operation of the vehicle (e.g., operation of the vehicle on a particular stretch of roadway). The amount of the discount may increase as the number of vehicle occupants increases and in accordance with any suitable proportional behavior.

In various embodiments, the tolling system may include a tolling infrastructure. The tolling infrastructure may include, for example, a series of checkpoints in connection with which associated toll amounts may be determined. For example, the toll amount associated with a particular checkpoint may correspond to a fee assessed for use of a roadway between the particular checkpoint and an immediately adjacent checkpoint. At each checkpoint, a receiver may be provided for receiving the vehicle occupancy information transmitted from a vehicle in proximity to the checkpoint. The receiver may be, but is not limited to, a wireless receiver (e.g., a DSRC receiver, an RFID interrogator or reader, etc.) configured to receive a wireless signal indicative of the vehicle occupancy information from a transmitter (e.g., a DSRC transmitter, a reprogrammable electronic tolling tag, etc.). The vehicle occupancy information may be transmitted from the tolling infrastructure (or more specifically the receiver) to one or more computers of the tolling system, which may be provided locally to the tolling infrastructure or remotely, and which may determine a toll amount based on the vehicle occupancy information. In certain embodiments, the toll amount may include a toll discount to be applied to a default toll amount. In other embodiments, the tolling system may determine that no toll discount is available based on the number of vehicle occupants indicated by the vehicle occupancy information.

The embodiments described above as well as additional embodiments of the disclosure will be described in greater detail through reference to the accompanying drawings.

Illustrative Architecture

Figure 1B:
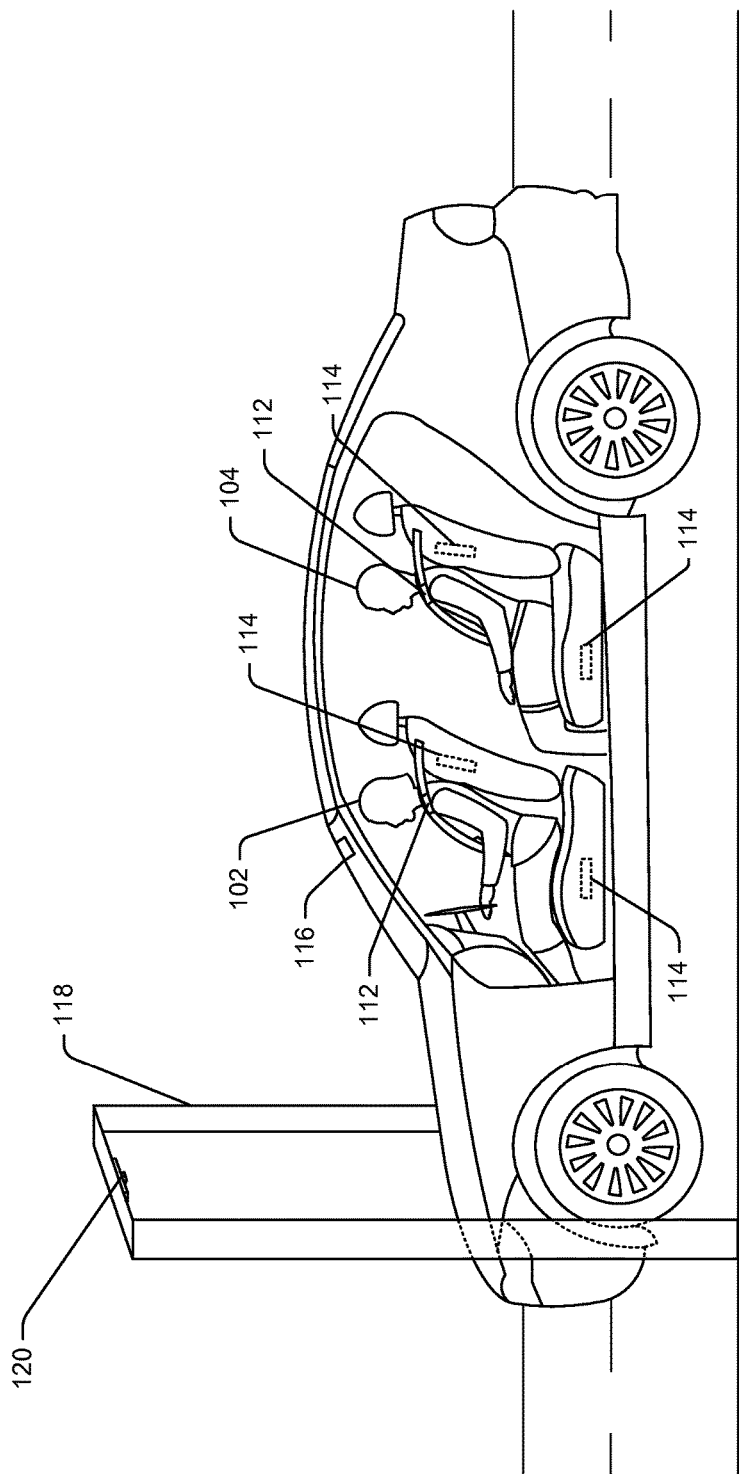
FIG. 1B schematically depicts the illustrative vehicle depicted in FIG. 1A in association with a tolling infrastructure in accordance with one or more embodiments of the disclosure.

FIG. 1A schematically depicts an illustrative vehicle 100 that includes various illustrative components in accordance with one or more embodiments of the disclosure. FIG. 1B schematically depicts the illustrative vehicle depicted in FIG. 1A in association with a tolling infrastructure in accordance with one or more embodiments of the disclosure. Although depicted in a particular manner in FIGS. 1A-1B, it should be appreciated that embodiments of the disclosure are applicable to any type of vehicle including any type of motorized vehicle.

The vehicle 100 is illustratively shown in FIG. 1A as including two types of occupants—a driver 102 and a plurality of passengers 104(1)-104(N). However, it should be appreciated that zero or more passengers 104 may be present in the vehicle 100. The vehicle 100 may include an IVI system 106 configured to receive sensor data from one or more in-vehicle sensors and determine a number of vehicle occupants based at least in part on the sensor data. Functionality supported by the IVI system 106 will be described in more detail through reference to FIG. 2.

A variety of types of sensors are illustratively depicted in FIGS. 1A-1B. For example, one or more image capturing devices 108 may be provided at various positions within the vehicle 100. For example, an image capturing device 108 may be centrally located towards a front of the vehicle 100 and may be capable of capturing an image of an entire interior cabin of the vehicle 100 and may potentially support facial recognition functionality for identifying and distinguishing facial characteristics associated with unique vehicle occupants. Additional image capturing devices 108 may be provided at other locations such as on the rear of the front seats of the vehicle 100 or at any other suitable location. The sensors may additionally or alternatively include one or more audio capturing devices 110 (e.g., a microphone) positioned at various locations within the vehicle 100. The IVI system 106 may support voice recognition functionality for analyzing audio data received from the audio capturing device(s) 110 and identifying a number of unique vehicle occupants. As further depicted in FIG. 1A, the sensors may additionally or alternatively include one or more heart rate sensors 112 for detecting a heart rate potentially associated with an occupant of the vehicle 100. The heart rate sensor(s) 112 are illustratively depicted as being embedded in various seat belts. As depicted in FIG. 1B, the sensors may additionally or alternatively include one or more sensors 114 that may be embedded within the seats of the vehicle 100 or otherwise suitably provided in association with the vehicle 100. The sensor(s) 114 may include pressure sensors, temperature sensors, and so forth. It should be appreciated that the types and positioning of the sensors depicted in FIGS. 1A-1B are merely illustrative and not exhaustive and that embodiments of the disclosure encompass any suitable number, type or positioning of sensors for capturing data indicative of a number of vehicle occupants.

Sensor data captured by any one or more of the sensors described above may be received by the system 106. The IVI system 106 may analyze the sensor data in accordance with any suitable algorithm to determine vehicle occupancy information indicating a number of vehicle occupants. For example, the IVI system 106 may analyze the sensor data to determine that five occupants are presently within the vehicle as depicted illustratively in FIG. 1A. The sensor data may be continuously gathered by the sensors or periodically determined and refreshed at specific intervals and/or upon satisfaction of an occupancy determination condition. In certain embodiments, the sensor data may be continuously captured by the sensors but may be received and/or analyzed by the IVI system 106 at specific intervals and/or upon satisfaction of an occupancy determination condition. An illustrative occupancy determination condition is illustratively depicted in FIG. 1A in which a door of the vehicle 100 is open. However, any of a variety of occupancy determination conditions such as any of those previously mentioned are within the scope of this disclosure.

In various embodiments, a transmitter 116 (FIG. 1B) may be provided in the vehicle 100. The transmitter 116 may be configured to transmit the vehicle occupancy information such that one or more incentives may be determined based on the information. The transmitter 116 may transmit the vehicle occupancy information at the direction, for example, of the IVI system 106. For example, the transmitter 116 may be configured to transmit the vehicle occupancy information to one or more remote servers using, for example, a wireless communications network in accordance with an appropriate wireless communications standard or protocol. The remote server(s) may store operational information associated with the vehicle 100 such as the vehicle occupancy information (potentially including historical vehicle occupancy information), information relating, to one or more incentives available based on the vehicle occupancy information (e.g., toll discounts), information relating to redemption of the incentive(s), and so forth. The remote server(s) may form part of a network service to which a vehicle operator is subscribed, may be hosted by any public, private, or governmental entity that determines incentive(s) based on vehicle occupancy information; and so forth.

In certain embodiments, the transmitter 116 may be configured to wirelessly transmit the vehicle occupancy information to a receiver 120 associated with at least a portion of a tolling infrastructure. The transmitter 116 may be configured to transmit, to the receiver 120, information that identifies the vehicle 100 in addition to the vehicle occupancy information. The tolling infrastructure may include, for example, a checkpoint 118 for which an associated toll amount may be assessed in connection with a vehicle passing through the checkpoint 118. In certain embodiments, the transmitter 116 may be a DSRC transmitter or other similar device capable of broadcasting short-range wireless transmissions and the receiver 120 may be a DSRC receiver or other similar device capable of receiving such transmissions when in range. Alternatively, the transmitter 116 may be a reprogrammable electronic tolling tag. Referring to those embodiments in which the transmitter 116 is an electronic tolling tag, the vehicle occupancy information may be transmitted from the IVI system 106 and stored on the tolling tag 116. The tolling tag 116 may be configured to transmit the vehicle occupancy information to the receiver 120 using, for example, radio frequencies. In such embodiments, the receiver 120 may be an RFID reader or interrogator or other similar device. When the vehicle 100 is within a certain proximity to the RFID device 120, an interrogation signal transmitted by the RFID device 120 may be received by the tolling tag 116 and a response signal indicative of the vehicle occupancy information may be transmitted from the tolling tag 116 to the RFID device 120.

In various embodiments, the transmitter 116 may also transmit vehicle identifying information that uniquely identifies the particular vehicle 100 with which the vehicle occupancy information is associated. Receipt of the identifying information may allow a toll amount to be assessed to an appropriate tolling account associated with the vehicle 100. Upon receipt of the vehicle occupancy information and the vehicle identifying information by the receiver 120, the information may be provided, for example, to one or more computers of a tolling system (which may be provided locally and/or remotely from the tolling infrastructure) for a determination of a toll amount to be assessed based on the vehicle occupancy information. Although specific illustrative examples of the transmitter 116, the receiver 120 and the mechanisms for transmitting and receiving the vehicle occupancy information are described above, it should be appreciated that the vehicle occupancy information may be transmitted by any device to any other device and in accordance with any suitable communication mechanism and/or protocol.

Figure 2:
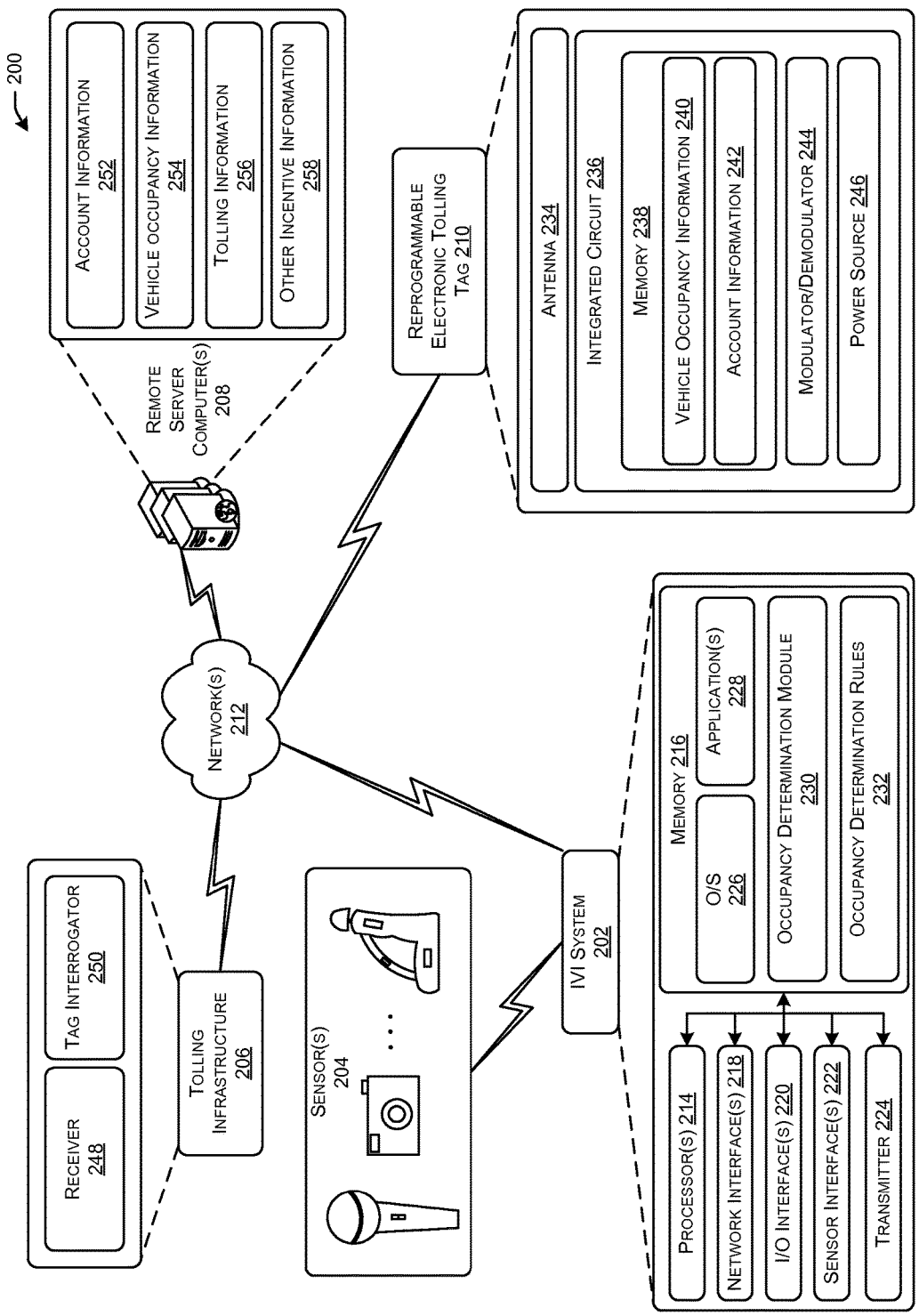
FIG. 2 is a schematic block diagram of an illustrative system architecture for identifying one or more incentives based on vehicle occupancy in accordance with one or more embodiments of the disclosure.

FIG. 2 is a schematic block diagram of an illustrative system architecture 200 for identifying one or more incentives based on vehicle occupancy in accordance with one or more embodiments of the disclosure. While the architecture 200 is illustratively depicted in the context of determining toll discounts based on vehicle occupancy information, it should be appreciated that the illustrative architecture 200 and other architectures within the scope of this disclosure may facilitate the determination of a variety of types of incentives based on vehicle occupancy information.

The illustrative architecture 200 includes a system 202 that may correspond to for example, IVI system 106. While the system 202 will be described in the context of an IVI system, it should be appreciated that the system 202 may include any suitable data processing system configured to receive input from any of a variety of sources and generate output data. Further, it should be appreciated that any one or more components of the system 202 may be provided remotely from a vehicle. The architecture 200 may further include one or more sensors 204 which may include, but are not limited to, any of the in-vehicle sensors depicted in FIGS. 1A-1B. In addition, a tolling infrastructure 206, one or more remote servers 208, and a reprogrammable electronic tolling tag 210 may be provided. Any one or more of the IVI system 202, the tolling infrastructure 206, the remote server computer(s) 208, and the tolling tag 210 may be configured to communicate with any one or more of the other components via one or more networks 212. The network(s) 212 may include, but are not limited to, any one or a combination of different types of suitable communications networks, such as cable networks, the Internet, wireless networks, cellular networks, or any other private and/or public networks.

The IVI system 202 may include various hardware, firmware, and/or software components. For example, the IVI system 202 may include one or more processors (processor(s)) 214 and one or more memories 216 (hereinafter collectively or individually referred to as memory 214. The processor(s) 214 may include any suitable processing unit capable of accepting digital data as input, processing the input data based on stored computer-executable instructions, and generating output data. The computer-executable instructions may be stored, for example, in the memory 216 and may include operating system software, application software, program modules, and so forth. The processor(s) 214 may be configured to execute the computer-executable instructions to cause various operations to be performed. The processor(s) 214 may include any type of processing unit including, but not limited to, a central processing unit, a microprocessor, a microcontroller, a Reduced Instruction Set Computer (RISC) microprocessor, a microcontroller, a system-on-a-chip (SoC), a mobile processor, an Application Specific Integrated Circuit (ASIC), and so forth.

The memory 216 may store program instructions that are loadable and executable by the processor(s) 214, as well as data manipulated and generated by the processor(s) 214 during execution of the program instructions. Depending on the configuration and implementation of the IVI system 202, the memory 216 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 216 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The IVI system 202 may further include one or more network interfaces 218 that allow the IVI system 202 to communicate with other devices or application software via, one or more networks and/or one or more input/output (I/O) interfaces 220 (and optionally associated software components such as device drivers) that may support various I/O devices, such as a keyboard, a mouse, a pen, a voice input device, a touch input device, a display, speakers, a camera, a microphone, a printer, and so forth, for receiving user input and/or providing, output to a user such as a vehicle occupant.

The system 202 may further include one or more sensor interfaces 222 that facilitate receipt of sensor data received, for example, from the sensor(s) 204. One or more dedicated processors (e.g., any one or more of the processor(s) 214) may be configured to receive sensor data via the sensor interface(s) 222 and analyze the received data to generate vehicle occupancy information. The IVI system 202 may further include a transmitter 224 which may be, for example, a device (e.g., a DSRC transmitter) capable of transmitting, vehicle occupancy information wirelessly to a receiver provided externally to the vehicle. Although depicted as forming, part of the IVI system 202, the transmitter 224 may be distinct from the IVI system 202 but nonetheless capable of communicating with the IVI system 202.

Referring again to the memory 216, various modules may be stored therein that comprise computer-executable instructions that upon execution by the processor(s) 214 cause various operations to be performed. For example, the memory 215 may have loaded therein an operating system (O/S) 226 that provides an interface between other application(s) 228 executing on the IVI system 202 and hardware resources of the IVI system 202. More specifically, the O/S 226 may include a set of computer-executable instructions for managing hardware resources of the IVI system 202 and for providing common services to other application programs 228 (e.g., managing, memory allocation among various application programs). The O/S 225 may include any operating system now known or which may be developed in the future such as any of a variety of mobile operating systems.

The memory 216 may additionally include various other program modules that may provide various associated functionality such as, for example, an occupancy determination module 230. The occupancy determination module 230 may include computer-executable instructions for receiving sensor data from one or more sensors 204 and analyzing the sensor data to determine a number of vehicle occupants. The occupancy determination module 230 may further include computer-executable instructions for generating vehicle occupancy information indicative of the determined number of vehicle occupants. In certain embodiments, the vehicle occupancy information may further include historical vehicle occupancy information determined based on various instances of sensor data received from the sensor(s) 204. The historical vehicle occupancy information may be indicative of a number of vehicle occupants during different time periods of operation of the vehicle.

In various embodiments, the number of vehicle occupants may be determined based at least in part on one or more occupancy determination rules 232. The rules 232 may specify one or more algorithms for determining vehicle occupancy based on received sensor data, rules specifying intervals at which to re-initiate the vehicle occupancy determination based on current sensor data, rules specifying, occupancy determination conditions that trigger an occupancy determination, and so forth. The rules 232 may include any suitable information that affects the nature or timing of the occupancy determination made by the occupancy determination module 230.

In various embodiments, upon generation of the vehicle occupancy information, the IVI system 202 may be configured to transmit the information to, for example, a tolling infrastructure 206. The tolling infrastructure may include a receiver 248 for receiving the vehicle occupancy information. In certain embodiments, the transmitter 224 may be configured to transmit (e.g., broadcast) the vehicle occupancy information in accordance with a wireless communications standard (e.g., a DSRC standard) to the receiver 248. Identifying information associated with the vehicle, an owner of the vehicle, or the like may be transmitted along with the vehicle occupancy information or separately therefrom. Information that is transmitted from the transmitter 224 to the receiver 248 may optionally be encrypted or otherwise sent as a secure transmission in order to mitigate the risk of theft of the information.

Upon receipt of the vehicle occupancy information and the vehicle identifying information, the received information may be transmitted from the tolling infrastructure 206 to one or more computers (e.g., one or more of the remote server computers 208) forming part of a tolling system that may determine a toll amount to be assessed to a tolling account with which the vehicle is associated. In certain embodiments, an amount of a toll discount may be determined based on the vehicle occupancy information, and a standard toll amount may be discounted by the amount of the toll discount to arrive at the toll amount to be assessed. For example, in certain embodiments, each increase in the number of vehicle occupants (beyond a threshold number of occupants) may be associated with a respective corresponding amount of a toll discount.

In various embodiments, access to tolling information 256 that includes information relating to toll amounts assessed in connection with one or more tolling accounts (including information relating to any toll discounts received) may be provided. A toiling account may be associated with any number of vehicles, and an individual associated with a tolling account (e.g., a registered owner of a vehicle associated with a tolling account) may access a corresponding portion of the tolling information 256 via, for example, one or more servers (e.g., one or more of the remote server computers 208) which may be hosted by, for example, an operator of the tolling system. The tolling system may further include one or more servers that store and provide access to account information 252 associated with any number of tolling accounts or other user accounts. A user may also be provided with access to vehicle occupancy information 254 via the remote server computer(s) 208. In certain embodiments, one or more servers forming part of the tolling system may store and provide access to the vehicle occupancy information 254. In other embodiments, the vehicle occupancy information 254 may be stored as part of a network service associated with the IVI system 202 (e.g., a subscription service) and access thereto may be provided via one or more servers (e.g., one or more of the remote server computers 208) forming part of the network service.

In certain embodiments, in addition to or in lieu of toll discounts, various other incentives may be identified or determined based on the vehicle occupancy information 254. A user may access other incentive information 258 associated with the various incentives determined to be available based on associated vehicle occupancy information 254 via, for example, one or more of the remote servers 208. Examples of types of incentives that may be identified or determined include, but are not limited to, a reduction in a fee associated with operation of a vehicle, an elimination of a fee, an incentive payment, reward points or other monetary rewards that may be redeemed for products or services, a discount associated with a product or service offering, and so forth. In certain embodiments, the vehicle occupancy information 254 may include historical vehicle occupancy information indicative of one or more vehicle occupancy parameters associated with operation of a vehicle over a given period of time. Various discounts including potentially additional toll discounts may be determined based on the historical vehicle occupancy information.

Referring again to the transmission of the vehicle occupancy information to the tolling infrastructure 206, numerous mechanisms for transmitting the information are within the scope of this disclosure. For example, in accordance with one or more embodiments of the disclosure, a reprogrammable electronic tolling tag 210 may be provided in association with a vehicle. The tolling tag 210 may be provided by a same entity that provides the IVI system 202 or by a different entity. The tolling tag 210 may illustratively include an antenna 234 for transmitting and receiving signals and an integrated circuit 236 for controlling the storage, transmission, and receipt of information by the tolling tag 210.

The integrated circuit 236 may include one or more memories (which may be collectively referred to herein as memory 238). The memory 238 may include any combination of volatile memory and/or non-volatile memory. The memory 238 may store vehicle occupancy information 240 which may indicate a number of vehicle occupants determined based on an analysis of the most recent sensor data. In certain embodiments each time (e.g., upon the occurrence of an occupancy determination condition) the number of vehicle occupants is re-determined based on currently available sensor data and corresponding vehicle occupancy information is generated, the vehicle occupancy information 240 may be stored on the tolling tag 210 in, for example, a writable, non-volatile portion of the memory 238. In addition to the vehicle occupancy information 240, account information 242 may also be stored in, for example, a non-rewritable, non-volatile portion of the memory 238. The account information 242 may include, for example, a vehicle identifier that uniquely identifies the vehicle with which the tolling tag 210 is associated, an account identifier that identifies a user account (e.g., a tolling account with which the tolling tag 210 and the vehicle are associated, and so forth.

The integrated circuit 236 may further include a modulator/demodulator 244 for modulating signals transmitted by the tolling tag 210 via the antenna 234 and/or for demodulating signals received by the tolling tag 210 via the antenna 234. Signal(s) indicative of the vehicle occupancy information 240 and the account information 242 may be transmitted by the antenna 234 to, for example, an interrogator 250 provided in association with the tolling infrastructure 206 in response to an interrogation signal received from the interrogator 250. In certain embodiments, the interrogator 250 may be an RFID interrogator that transmits, using radio frequencies, an interrogation signal that is received by the tolling tag 210 when within a suitable range from the interrogator 250. The tolling tag 210 may be passive, active, or battery-assisted passive. For example, the integrated circuit 236 may further include an internal power source 246 that allows the tolling tag 210 to periodically transmit signals indicative of the vehicle occupancy information 240 and/or the account information 242. In certain embodiments, the tolling tag 210 may operate in accordance with a battery-assisted passive mechanism in which the power source 246 is activated in the presence of the interrogator 250. In other embodiments, the tolling tag 210 may not include an internal power source 246 and instead may utilize radio energy present in a signal received from the interrogator 250 to transmit a response signal indicative of the vehicle occupancy information 240 and/or the account information 242.

It should be appreciated that the various hardware and software components depicted in FIG. 2 are merely illustrative and that, in some embodiments, all depicted components may not be present while in other embodiments additional components may be present. It should be appreciated that the functionality described herein as being provided by a particular component or set of components of the architecture 200 may, in various embodiments, be performed by one or more other depicted components of the architecture 200 and/or by one or more additional components not depicted. In addition, any of the depicted components may support additional functionality beyond that which has been described. Further, while certain functionality has been described in connection with certain program modules, it should be appreciated that such program modules may represent logical constructs and may not reflect an actual partitioning of associated software and/or firmware for implementing the functionality. Moreover, while various program modules and/or information have been depicted as being loaded into memory, it should be appreciated that functionality described as being supported or implemented by the program modules may be facilitated by any combination of hardware, software, and/or firmware.

While illustrative techniques and methodologies have been described with respect to the illustrative vehicle, tolling infrastructure, and tolling system depicted in one or more of FIGS. 1A-2, it should be appreciated that numerous other configurations are possible for implementing the illustrative techniques and methodologies disclosed herein. Accordingly, embodiments of the disclosure are not limited to any particular architectural configuration.

Illustrative Processes

Figure 3:
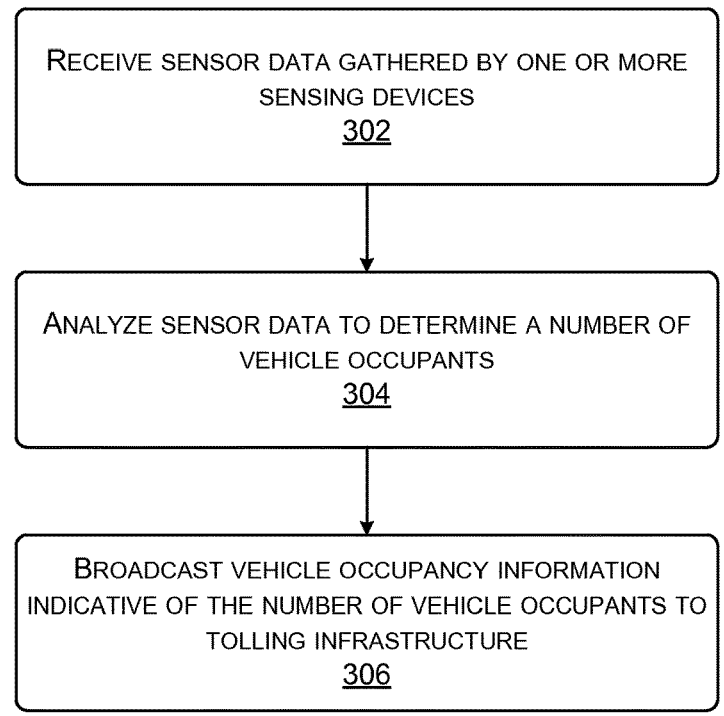
FIG. 3 is a process flow diagram of an illustrative method for determining a number of vehicle occupants and generating and transmitting vehicle occupancy information indicative thereof in accordance with one or more embodiments of the disclosure.

FIG. 3 is a process flow diagram of an illustrative method 300 for determining a number of vehicle occupants and generating and transmitting vehicle occupancy information indicative thereof in accordance with one or more embodiments of the disclosure. At block 302, sensor data gathered by one or more sensors 204 may be received by, for example, the IVI system 202.

At block 304, computer-executable instructions provided as part of, for example, the occupancy determination module 230 may be executed to analyze the sensor data to determine a number of vehicle occupants. As previously noted, the sensor data may be analyzed in accordance with one or more occupancy determination rules 232. Upon determining a number of vehicle occupants, vehicle occupancy information indicative thereof may be generated.

At block 306, the IVI system 202 may direct, for example, the transmitter 224 to broadcast a signal indicative of the vehicle occupancy information to the tolling infrastructure 206, or more specifically, the receiver 248 provided, in association with the tolling infrastructure 206. Identifying information that uniquely identifies a vehicle and/or a user account such as a tolling account may be transmitted as well.

Figure 4:
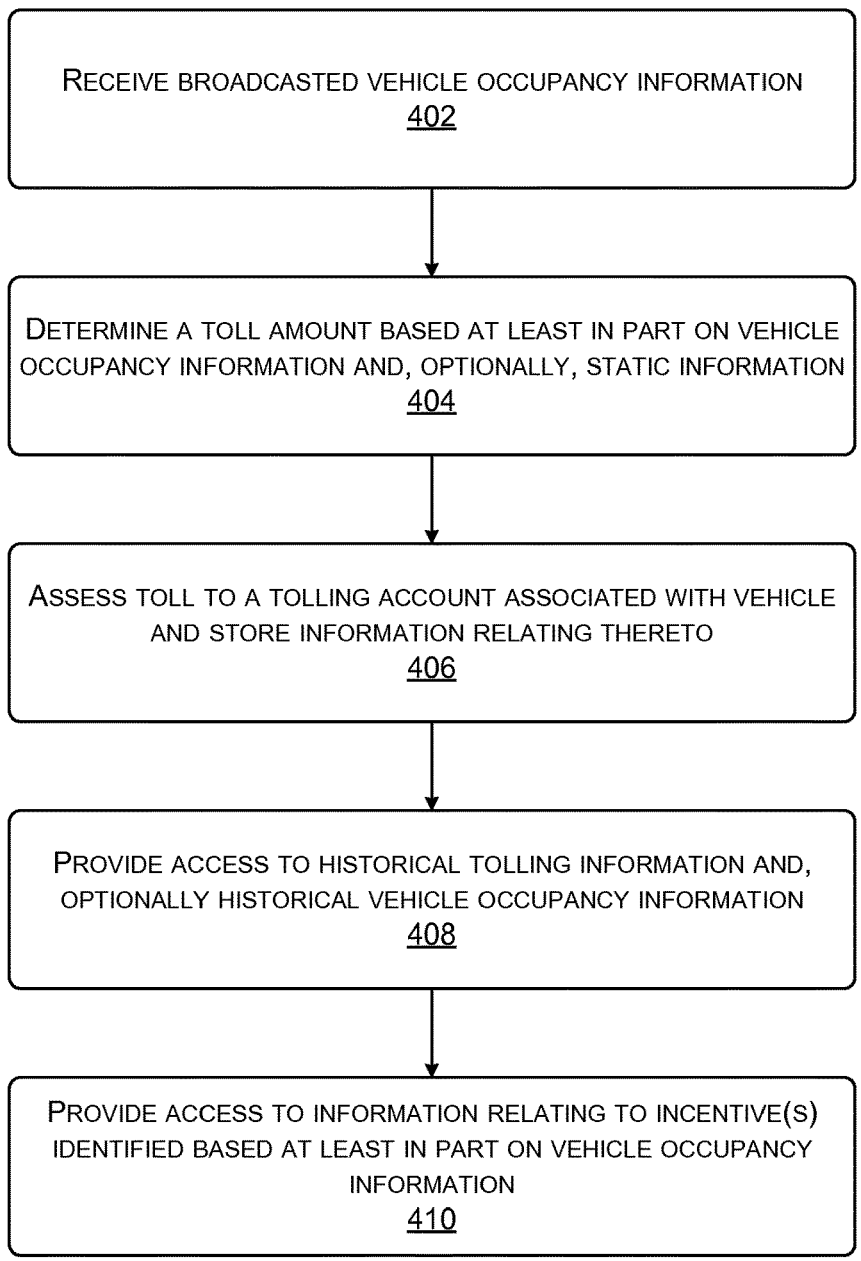
FIG. 4 is a process flow diagram of an illustrative method for determining a toll amount based at least in part on vehicle occupancy information in accordance with one or more embodiments of the disclosure.

FIG. 4 depicts a process flow diagram of an illustrative method 400, in accordance with one or more embodiments of the disclosure, for determining a toll amount based at least in part on vehicle occupancy information transmitted in accordance with the illustrative method 300 depicted in FIG. 3. One or more of the operations of the illustrative method 400 may be performed by a tolling system comprising one or more computers and which may optionally include a tolling infrastructure such as the tolling infrastructure 206.

At block 402, vehicle occupancy information broadcasted by the transmitter 224 may be received by, for example, the receiver 248 provided in association with the tolling infrastructure 206, information identifying the vehicle with which the vehicle occupancy information is associated and/or a tolling account with which the vehicle is associated may also be received in conjunction with the vehicle occupancy information.

At block 404, a toll amount may be determined based at least in part on the vehicle occupancy information and, optionally, further based at least in part on static information associated with the vehicle (e.g., one or more static characteristics associated with the vehicle). In certain embodiments, the vehicle occupancy information and the identifying information may be transmitted by the tolling infrastructure 206 to a tolling system comprising one or more computers which may be provided remotely and/or locally with respect to the tolling infrastructure 206. In certain embodiments, the tolling infrastructure 206 may form part of the tolling system.

The toll amount may be determined by adjusting a standard toll amount in accordance with a toll discount that may be determined based on the vehicle occupancy information. The standard toll amount may be determined based on static information associated with the vehicle and the particular vehicle operation (e.g., use of a particular stretch of roadway, use of a bridge, etc.) with which the toll amount is associated. The toll discount may only apply if the vehicle occupancy information indicates that at least a threshold number of vehicle occupants are present in the vehicle during the particular vehicle operation with which the toll amount is associated. An amount of the toll discount may be positively correlated to the number of vehicle occupants such that the amount of the discount increases with an increase in the number of vehicle occupants in accordance with any suitable proportional behavior.

At block 406, the determined toll amount may be assessed to a tolling account with which the vehicle is associated and information relating thereto may be stored on one or more servers (e.g., one or more of the remote servers 208). At block 408, the tolling system may provide a user such as a registered user of the tolling account with access to historical tolling information that indicates toll amounts (and any toll discounts) that have been assessed for vehicles associated with the tolling account. The user may also be provided with access to historical vehicle occupancy information indicative of one or more vehicle occupancy parameters associated with the vehicle over a given period of time.

At block 410, the user may be provided with access to information relating to one or more incentives identified based at least in part on vehicle occupancy information. In certain embodiments, the incentive(s) may include a reduction in a fee associated with use of a vehicle such as a discounted toll amount as discussed previously. In other embodiments, the incentive(s) may include discounts offered on product or service offerings. The incentive(s) may be determined based on vehicle occupancy information indicating a particular number of vehicle occupants associated with a vehicle for a specific period of time and/or historical vehicle occupancy information indicative of the state of various vehicle occupancy parameters over time. Further, in various embodiments, the incentive(s) may be unrelated to tolling, and thus, may be determined (and information relating thereto provided) by one or more systems other than a tolling system.

Figure 5:
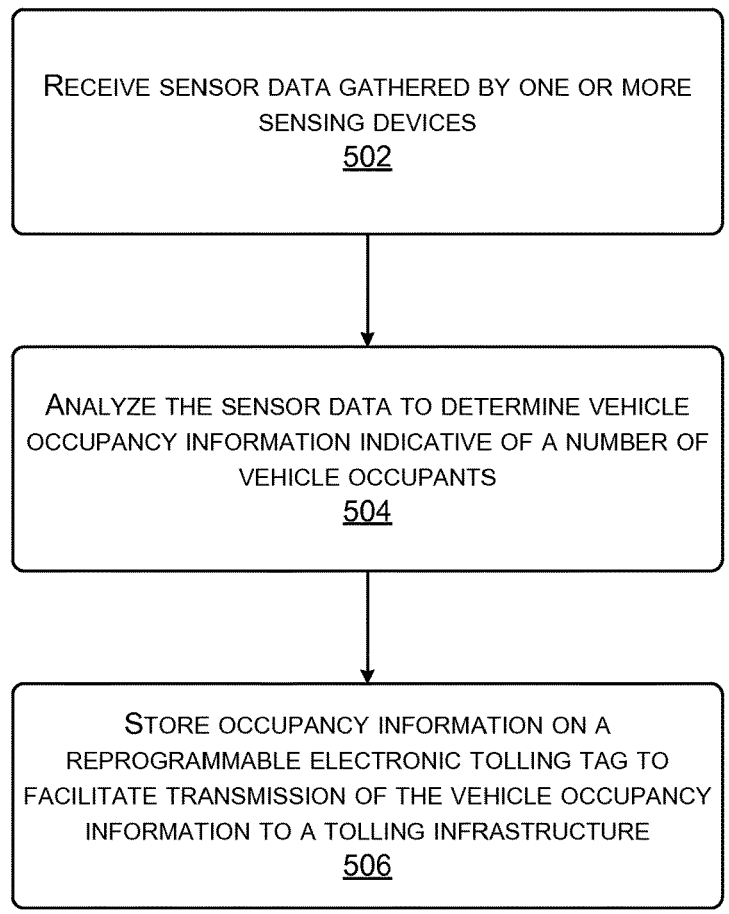
FIG. 5 is a process flow diagram of another illustrative method for determining a number of vehicle occupants and generating and transmitting vehicle occupancy information indicative thereof in accordance with one or more embodiments of the disclosure.

FIG. 5 is a process flow diagram of an illustrative method 500 for determining a number of vehicle occupants and generating and transmitting vehicle occupancy information indicative thereof in accordance with one or more additional or alternative embodiments of the disclosure. One or more of the operations forming part of the illustrative method 500 may be performed by the IVI system 202 and/or the tolling tag 210 configured to communicate with the IVI system 202.

At block 502, sensor data gathered by one or more sensors 204 may be received by, for example, the IVI system 202. At block 504, computer-executable instructions provided as part of, for example, the occupancy determination module 230 may be executed to analyze the sensor data to determine a number of vehicle occupants. As previously noted, the sensor data may be analyzed in accordance with one or more occupancy determination rules 232. Upon determining a number of vehicle occupants, vehicle occupancy information indicative thereof may be generated.

At block 506, the IVI system 202 may transmit the vehicle occupancy information to the tolling tag 210 for storage therein. The vehicle occupancy information may be stored on the tolling tag 210 in association with identifying information that uniquely identifies a vehicle and/or a user account such as a tolling account with which the vehicle is associated. By causing the vehicle occupancy information to be stored on the tolling tag 210, the IVI system 202 may facilitate transmission of the vehicle occupancy information to the tolling infrastructure 206.

Figure 6:
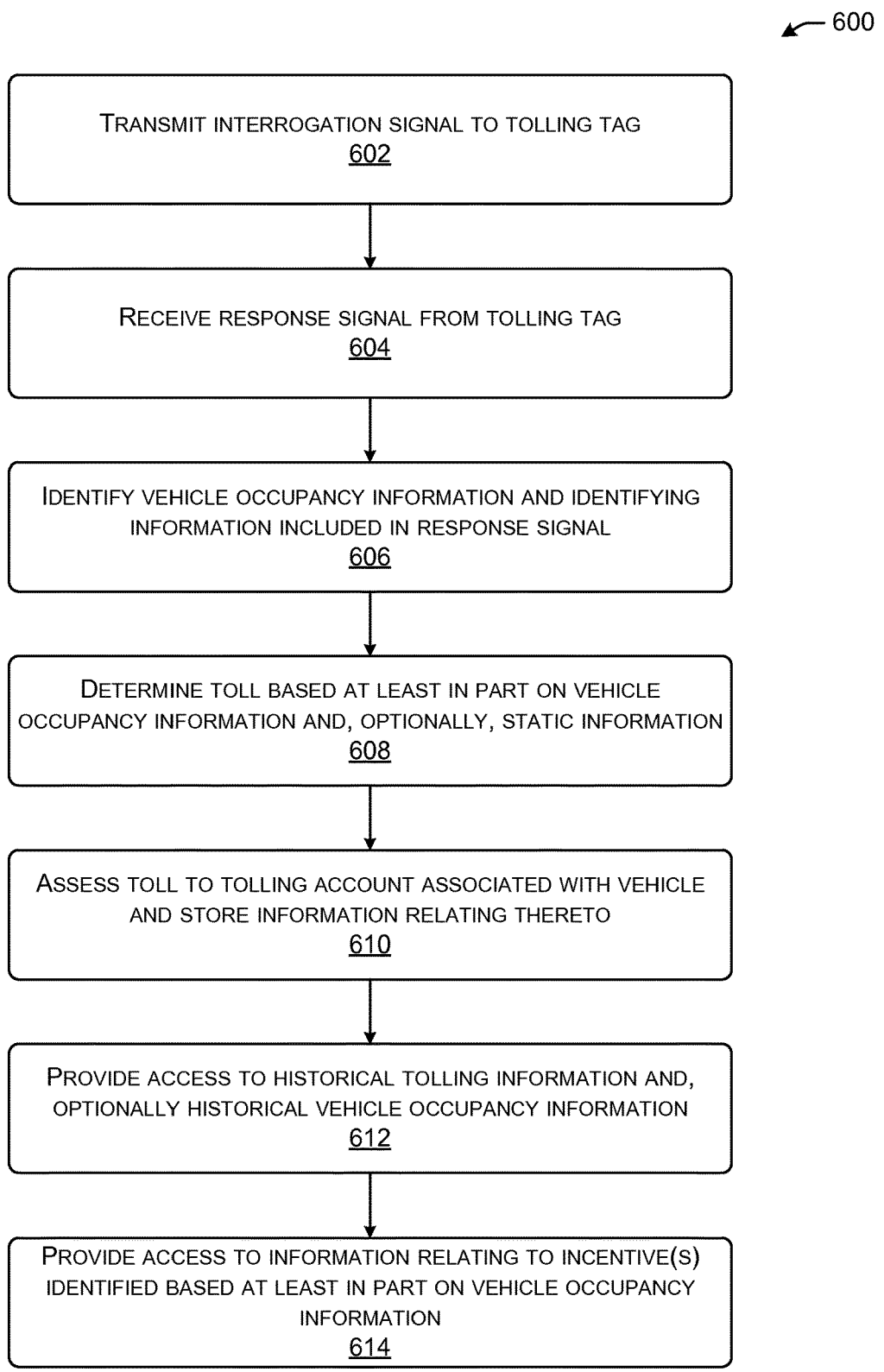
FIG. 6 is a process flow diagram of another illustrative method for determining a toll amount based at least in part on vehicle occupancy information in accordance with one or more embodiments of the disclosure.

FIG. 6 depicts a process flow diagram of an illustrative method 600, in accordance with one or more embodiments of the disclosure, for determining a toll amount based at least in part on vehicle occupancy information received in accordance with the illustrative method 500 depicted in FIG. 5. One or more of the operations of the illustrative method 600 may be performed by a tolling system comprising one or more computers and which may optionally include a tolling infrastructure such as the tolling infrastructure 206.

At block 602, an interrogation signal may be transmitted by, for example, the interrogator 250 provided in association with the tolling infrastructure 206. The interrogation signal may be received by the tolling tag 210 on the condition that the tolling tag 210 is within a suitable range of the interrogator 250 (e.g., when the vehicle in which the tolling tag 210 is positioned is in proximity to the tolling infrastructure).

At block 604, a response signal transmitted by the tolling tag 210 (or more specifically the antenna 234 of the tolling tag 210) may be received by the interrogator 230. At block 606, vehicle occupancy information indicative of a number of vehicle occupants may be identified from the response signal. In certain embodiments, various identifying information that uniquely identifies the vehicle and/or a tolling account with which the vehicle is associated may also be identified from the response signal.

At block 608, a toll amount may be determined based at least in part on the vehicle occupancy information and, optionally, further based at least in part on static information associated with the vehicle (e.g., one or more static characteristics associated with the vehicle). The toll amount may be determined, in accordance with any of the methodologies previously described. In certain embodiments, the vehicle occupancy information and the identifying information may be transmitted by the tolling infrastructure 206 to a tolling system comprising one or more computers which may be provided remotely and/or locally with respect to the tolling infrastructure 206. In certain embodiments, the tolling infrastructure 206 may form part of the tolling system.

At block 610, the determined toll amount may be assessed to a tolling account with which the vehicle is associated and information relating thereto may be stored on one or more servers (e.g., one or more of the remote servers 208). At block 612, the tolling system may provide a user, such as a registered user of the tolling account with access to historical tolling information that indicates toll amounts (and any toll discounts) that have been assessed for vehicles associated with the tolling account. The user may also be provided with access to historical vehicle occupancy information indicative of one or more vehicle occupancy parameters associated with the vehicle over a given period of time.

At block 614, the user may be provided with access to information relating to one or more incentives identified based at least in part on the vehicle occupancy information. In certain embodiments, the incentive(s) may include a reduction in a fee associated with use of a vehicle such as a discounted toll amount as discussed previously. In other embodiments, the incentive(s) may include discounts offered on product or service offerings which may be identified in lieu of, or in addition to, a discounted toll amount or another reduction in a fee associated with operation of a vehicle. The incentive(s) may be determined based on vehicle occupancy information that indicates a particular number of vehicle occupants associated with a vehicle for a specific period of time and/or historical vehicle occupancy information that indicates the state of various vehicle occupancy parameters over time. Further, in various embodiments, the incentive(s) may be unrelated to tolling, and thus, may be determined (and information relating thereto provided) by by one or more systems other than a tolling system.

Although not depicted in FIGS. 4 and 6, upon receipt of the vehicle occupancy information, the tolling system may utilize data received from one or more sensors associated with the tolling infrastructure 206 to confirm or modify the number of vehicle occupants. For example, in certain embodiments, inconsistencies ma be present in sensor data received from various in-vehicle sensors that may limit an accuracy of the determination by the IVI system 202 of the number of vehicle occupants. In such scenarios, an indication of such inconsistencies may be transmitted to the tolling system, and the tolling system may independently verify the vehicle occupancy information. For example, data received from an image capturing device provided in association with the tolling infrastructure 206 may be utilized to confirm or reject the number of vehicle occupants indicated by the vehicle occupancy information. Data received from sensors external to the vehicle (e.g., sensor(s) associated with the tolling infrastructure 206) may additionally or alternatively be used as a security measure to ensure that the vehicle occupancy information has not been altered or corrupted in some manner such that the information does not reflect the actual number of vehicle occupants.

Figure 7:
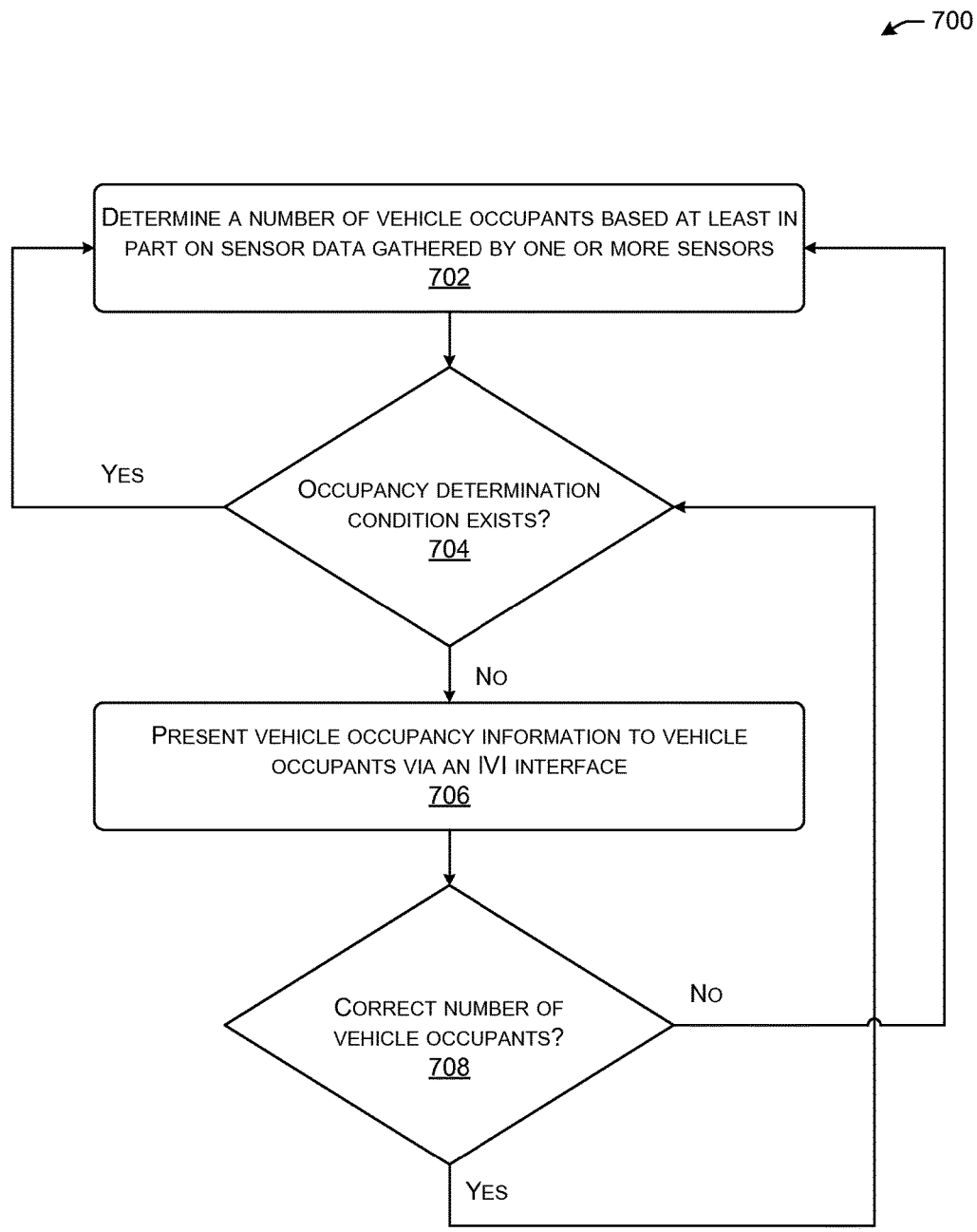
FIG. 7 is a process flow diagram of an illustrative method for determining a number of vehicle occupants based at least in part on sensor data received from one or more sensors in accordance with one or more embodiments of the disclosure.

FIG. 7 is a process flow diagram of an illustrative method 700, in accordance with one or more embodiments of the disclosure, for determining a number of vehicle occupants based on sensor data. One or more of the operations forming part of the illustrative method 700 may be performed upon execution of computer-executable instructions provided as part of, for example, the occupancy determination module 230.

At block 702, a number of vehicle occupants may be determined based at least in part on sensor data received from and gathered by one or more sensors. The sensors may include, for example, one or more of the in-vehicle sensors 204 such as any of the types of sensors depicted in FIGS. 1A-1B.

At block 704, a determination may be made as to whether an occupancy determination condition exists. Illustrative occupancy determination conditions include, but are not limited to, the opening and/or closing of a door of the vehicle, the opening and/or closing of a window of the vehicle, a speed of the vehicle being below a predetermined threshold, use of an ignition of the vehicle, and so forth.

If it is determined, at block 704, that an occupancy determination condition exists, the method 700 may again proceed to block 702 where the number of vehicle occupants may be re-determined based on sensor data indicative of a current state of the vehicle. On the other hand, if it is determined, at block 704, that an occupancy determination condition does not exist, the method 700 may proceed to block 706 wherein vehicle occupancy information indicative of a current number of vehicle occupants may be presented via an interface (e.g., a display) associated with the IVI system 202.

At block 708, a determination may be made as to whether a correct number of vehicle occupants are indicated by the vehicle occupancy information. The determination may be made in response to input received from a vehicle occupant via an interface of the IVI system 202. For example, the IVI system 202 may support functionality for allowing a vehicle occupant to indicate that the vehicle occupancy information is inaccurate. If it is determined that the vehicle occupancy information indicates an inaccurate number of vehicle occupants based, for example, on input received from a vehicle occupant, the method 700 may again proceed to block 702 where the number of vehicle occupants may be re-determined based on current sensor data. On the other hand, if it is determined at block 708 that the vehicle occupancy information indicates an accurate number of vehicle occupants, the method may again proceed to block 704 where a determination may be made as to whether an occupancy determination condition exists. In certain embodiments, the determination that the vehicle occupancy information indicates a correct number of vehicle occupants may be made if no input indicating otherwise is received from a vehicle occupant within a predetermined period of time.

Certain aspects of the disclosure are described above with reference to block and flow diagrams of systems methods, apparatuses, and/or computer program products according to illustrative embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any was required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
receiving, by one or more computer processors associated with a vehicle, sensor data from one or more sensors;
determining, by the one or more computer processors, that a vehicle occupancy determination condition is satisfied, based on a speed of the vehicle being below a first predetermined threshold;
determining, by the one or more computer processors and based at least in part on the sensor data, a first metric indicative of a likelihood of a first potential number of occupants of the vehicle and a second metric indicative of a likelihood of a second potential number of occupants of the vehicle, wherein the first metric is less than a second predetermined threshold, and the second metric is less than the second predetermined threshold:
determining, by the one or more computer processors, that the first metric is greater than the second metric;
determining, by the one or more computer processors, that a vehicle occupancy of the vehicle corresponds to the first potential number of occupants based at least in part on the determining that the first metric is greater than the second metric; and
causing to send, by the one or more computer processors, vehicle occupancy information indicative of the vehicle occupancy, and time information indicative of a percentage of time the vehicle spends on each of one or more types of infrastructure, via a reprogrammable electronic tolling tag associated with the one or more computer processors, to an interrogator associated with a tolling infrastructure responsive to an interrogation signal received from the interrogator, wherein:
one or more incentives are identified based at least in part:
on the vehicle occupancy information, and
the time information indicative of the percentage of time the vehicle spends on each of the one or more types of infrastructure, and
the reprogrammable electronic tolling tag receives the sensor data from the one or more sensors via the one or more computer processors.

2. The method of claim 1, wherein the one or more incentives comprise a reduction in a fee associated with operation of the vehicle.

3. The method of claim 2, wherein the fee comprises a standard toll amount associated with the operation of the vehicle and the reduction comprises a discount by which the standard toll amount is adjusted, and wherein an amount of the discount increases as the vehicle occupancy increases.

4. The method of claim 1, wherein facilitating transmission of the vehicle occupancy information comprises:
storing, by the one or more computer processors, the vehicle occupancy information on the reprogrammable electronic tolling tag.

5. The method of claim 1, wherein the sensor data is first sensor data and the vehicle occupancy is first vehicle occupancy, the method further comprising:
receiving, by the one or more computer processors, second sensor data from the one or more sensors;
determining, by the one or more computer processors, and based at least in part on the second sensor data, a third metric indicative of a likelihood of the first potential number of occupants of the vehicle and a fourth metric indicative of a likelihood of the second potential number of occupants of the vehicle; and
determining, by the one or more computer processors, that the third metric and the fourth metric are each less than a third predetermined threshold,
wherein a second vehicle occupancy of the vehicle is determined based at least in part on, sensor data captured by one or more sensors external to the vehicle.

6. The method of claim 1, wherein the vehicle occupancy determination condition comprises one of:
i) opening or closing a door of the vehicle,
ii) opening or closing a window of the vehicle, or
iii) use of an ignition of the vehicle.

7. The method of claim 1, wherein determining that the vehicle occupancy corresponds to the first potential number of vehicle occupants comprises using a first portion of the sensor data received from a first sensor to confirm the first potential number of occupants of the vehicle, and wherein determining the first metric comprises calculating the first metric from a second portion of the sensor data received from a second sensor.

8. The method of claim 1, further comprising:
transmitting, by the one or more computer processors, the vehicle occupancy information for presentation to at least one occupant of the vehicle;
receiving, by the one or more computer processors, input indicating that the vehicle occupancy information is inaccurate; and
re-determining, by the one or more computer processors, the vehicle occupancy responsive to the input.

9. One or more non-transitory computer-readable media comprising computer-executable instructions that responsive to execution by one or more computer processors, configure the one or more computer processors to perform operations comprising:
receiving, by the one or more computer processors, sensor data from one or more sensors;
determining, by the one or more computer processors, that a vehicle occupancy determination condition is satisfied, based on a speed of a vehicle being below a first predetermined threshold;
determining, by the one or more computer processors and based at least in part on the sensor data, a first metric indicative of a likelihood of a first potential number of occupants of the vehicle and a second metric indicative of a likelihood of a second potential number of occupants of the vehicle, wherein the first metric is less than a second predetermined threshold, and the second metric is less than the second predetermined threshold;
determining, by the one or more computer processors, that the first metric is greater than the second metric;
determining, by the one or more computer processors, that a vehicle occupancy of the vehicle corresponds to the first potential number of occupants based at least in part on the determining that the first metric is greater than the second metric; and
causing to send, by the one or more computer processors, vehicle occupancy information indicative of the vehicle occupancy, and time information indicative of a percentage of time the vehicle spends on each of one or more types of infrastructure, via a reprogrammable electronic tolling tag associated with the one or more computer processors, to a tolling infrastructure for assessment of a toll amount based at least in part on the vehicle occupancy information, wherein the reprogrammable electronic tolling tag receives the sensor data from the one or more sensors via the one or more computer processors.

10. The one or more computer-readable media of claim 9, wherein causing a transmitter to transmit the vehicle occupancy information comprises:
    storing the vehicle occupancy information on the reprogrammable electronic tolling tag.

11. The one or more computer-readable media of claim 9, the operations further comprising:
    directing, by the one or more computer processors, transmission of a vehicle identifier to the tolling infrastructure,
    wherein the toll amount is assessed to a tolling account associated with the vehicle identified by the vehicle identifier.

12. The one or more computer-readable media of claim 9, wherein the toll amount is further assessed based at least in part on static information associated with the vehicle.

13. A system associated with a vehicle, comprising:
    at least one processor; and
    at least one memory storing computer-executable instructions,
    wherein the at least one processor is configured to access the at least one memory and to execute the computer-executable instructions to:
        receive sensor data from one or more sensing devices;
        determine that a vehicle occupancy determination condition is satisfied, based on a speed of the vehicle being below a first predetermined threshold;
        determine, based at least in part on the sensor data, a first metric indicative of a likelihood of a first potential number of occupants of the vehicle and a second metric indicative of a likelihood of a second potential number of occupants of the vehicle, wherein the first metric is less than a second predetermined threshold, and the second metric is less than the second predetermined threshold:
        determine that the first metric is greater than the second metric;
        determine that a vehicle occupancy of the vehicle corresponds to the first potential number of vehicle occupants based at least in part on the determination that the first metric is greater than the second metric; and
        cause a reprogrammable electronic tolling tag, associated with the vehicle, to send vehicle occupancy information indicative of the vehicle occupancy, and time information indicative of a percentage of time the vehicle spends on each of one or more types of infrastructure, to an interrogator associated with a tolling infrastructure, responsive to an interrogation signal received from the interrogator, wherein:
            one or more incentives are identified based at least in part:
                on the vehicle occupancy information, and
                    the time information indicative of the percentage of time the vehicle spends on each of the one or more types of infrastructure, and
                the reprogrammable electronic tolling tag receives the sensor data from the one or more sensing devices via the at least one processor.

14. The system of claim 13, wherein the one or more incentives comprise a reduction in a fee associated with operation of the vehicle.

15. The system of claim 13, wherein the vehicle occupancy information comprises historical vehicle occupancy information indicative of one or more vehicle occupancy parameters associated with operation of the vehicle.

16. The system of claim 15, wherein the one or more vehicle occupancy parameters comprise a parameter indicative of a respective amount of vehicle travel time associated with the first potential number of occupants of the vehicle and the second potential number of occupants of the vehicle.

17. The system of claim 15, wherein the one or more incentives comprise a discount associated with a product or service offering, wherein the discount is determined based at least in part on the historical vehicle occupancy information.

18. A method, comprising:
    receiving, by a tolling system comprising one or more computers,
        speed information associated with a vehicle, and
        vehicle occupancy information indicative of:
            a first potential number of occupants of the vehicle and a second potential number of occupants of the vehicle, wherein the first potential number of occupants and the second potential number of occupants are determined from sensor data generated by one or more sensors associated with the vehicle, and wherein a first metric indicative of a likelihood of the first potential number of occupants of the vehicle and a second metric indicative of a likelihood of the second potential number of occupants of the vehicle are each less than a first predetermined threshold, and
        time information indicative of a percentage of time the vehicle spends on each of one or more types of infrastructure;
    determining, by the tolling system, that a vehicle occupancy determination condition is satisfied, based on the speed information associated with the vehicle being below a second predetermined threshold;
    determining, by the tolling system, a vehicle occupancy for the vehicle based at least in part on the sensor data generated by the one or more sensors external to the vehicle;
    determining, by the tolling system, a toll amount based at least in part on the vehicle occupancy information;
    assessing, by the tolling system, the toll amount to a tolling account associated with the vehicle; and
    causing to send, by the tolling system, the vehicle occupancy information to one or more remote server computers.

19. The method of claim 18, wherein the tolling system further comprises tolling infrastructure, further comprising:
    receiving, by a receiver associated with the tolling infrastructure from a transmitter associated with the vehicle, a signal indicative of the vehicle occupancy information.

20. The method of claim 19, wherein the receiver associated with the tolling infrastructure is configured to be:
    (i) a receiver to receive the signal in accordance with a wireless communications protocol, or
    (ii) a radio frequency identification (RFID) interrogator.

21. The method of claim 20, wherein the receiver associated with the tolling infrastructure comprises the RFID interrogator and the transmitter associated with the vehicle comprises a reprogrammable electronic tolling tag, further comprising:

transmitting, by the RFID interrogator, an interrogation signal to the reprogrammable electronic tolling tag, wherein the signal indicative of the vehicle occupancy information is received from the reprogrammable electronic tolling tag responsive to the interrogation signal.

22. The method of claim 18, wherein the toll amount comprises a fee assessed for operation of the vehicle on at least a portion of a roadway.

23. The method of claim 18, wherein determining the toll amount comprises:
determining, by the tolling system, an amount of a toll discount based at least in part on the vehicle occupancy; and
determining, by the tolling system, the toll amount by adjusting a standard toll amount based at least in part on the amount of the toll discount.

24. The method of claim 23, wherein the vehicle occupancy information is received by the tolling system from a portion of a tolling infrastructure associated with the tolling system, and wherein the standard toll amount is associated with the portion of the tolling infrastructure.

25. One or more non-transitory computer-readable media storing computer-executable instructions that responsive to execution by at least one processor configure the at least one processor to perform operations comprising:
receiving speed information associated with a vehicle, vehicle occupancy information indicative of:
a first potential number of occupants of the vehicle and a second potential number of occupants of the vehicle, wherein the first potential number of occupants and the second potential number of occupants are determined from sensor data generated by one or more sensors associated with the vehicle, and wherein a first metric indicative of a likelihood of the first potential number of occupants of the vehicle and a second metric indicative of a likelihood of the second potential number of occupants of the vehicle are each less than a first predetermined threshold, and
time information indicative of a percentage of time the vehicle spends on each of one or more types of infrastructure;
determining that a vehicle occupancy determination condition is satisfied, based on the speed information associated with the vehicle being below a second predetermined threshold;
determining a vehicle occupancy based at least in part on:
sensor data generated by one or more sensors external to the vehicle, and a speed of the vehicle being below the second predetermined threshold;
determining a toll amount based at least in part on the vehicle occupancy information; and
causing to send, by the at least one processor to one or more computers, the vehicle occupancy information.

26. The one or more computer-readable media of claim 25, wherein determining the toll amount comprises:
determining a standard toll amount associated with use of at least a portion of a vehicle transport infrastructure;
determining an amount of a toll discount based at least in part on the vehicle occupancy; and
determining the toll amount by adjusting the standard toll amount by the amount of the toll discount.

27. The one or more computer-readable media of claim 26, wherein the amount of the toll discount is positively correlated with the vehicle occupancy.

28. A system, comprising:
at least one processor; and
at least one memory storing computer-executable instructions,
wherein the at least one processor is configured to access the at least one memory and to execute the computer-executable instructions to:
receive speed information associated with a vehicle, vehicle occupancy information indicative of:
a first potential number of occupants of the vehicle and a second potential number of occupants of the vehicle, wherein the first potential number of occupants and the second potential number of occupants are determined from sensor data generated by one or more sensors associated with the vehicle, and wherein a first metric indicative of a likelihood of the first potential number of occupants of the vehicle and a second metric indicative of a likelihood of the second potential number of occupants of the vehicle are each less than a first predetermined threshold, and
time information indicative of a percentage of time the vehicle spends on each of one or more types of infrastructure;
determine that a vehicle occupancy determination condition is satisfied, based on the speed information associated with the vehicle being below a second predetermined threshold;
determine a vehicle occupancy based at least in part on sensor data generated by one or more sensors external to the vehicle;
identify one or more incentives based at least in part on;
the vehicle occupancy, and
the time information indicative of the percentage of time the vehicle spends on each of the one or more types of infrastructure, and
cause to send, to one or more computers, the vehicle occupancy information.

29. The system of claim 28, wherein the one or more incentives comprise a discounted toll amount, and wherein an amount of a discount associated with the discounted toll amount is determined based at least in part on the vehicle occupancy.

30. The system of claim 28, wherein the vehicle occupancy information comprises historical vehicle occupancy information indicative of one or more vehicle occupancy parameters associated with operation of the vehicle over a period of time.

31. The system of claim 30, wherein the one or more vehicle occupancy parameters comprise a parameter indicative of a respective portion of the period of time during which each of the first potential number of vehicle occupants and the second potential number of occupants is associated with the vehicle.

32. The system of claim 31, wherein the one or more vehicle occupancy parameters comprise at least one of:
(i) a parameter indicative of a distance traveled by the vehicle during the period of time, or
(ii) a parameter indicative of an average speed of the vehicle during the period of time.

33. The system of claim 30, wherein the one or more incentives comprise a discount associated with a product or service offering, wherein an amount of the discount is determined based at least in part on the historical vehicle occupancy information.

* * * * *